(12) United States Patent
Qi et al.

(10) Patent No.: US 10,348,844 B2
(45) Date of Patent: Jul. 9, 2019

(54) METHOD AND DEVICE FOR MONITORING PUSH EFFECT OF PUSH INFORMATION

(71) Applicant: BEIJING GRIDSUM TECHNOLOGY CO., LTD., Beijing (CN)

(72) Inventors: Guosheng Qi, Beijing (CN); Fei Dai, Beijing (CN); Yongjian Huang, Beijing (CN); Guofa Yu, Beijing (CN)

(73) Assignee: BEIJING GRIDSUM TECHNOLOGY CO., LTD., Beijing (CN)

( * ) Notice: Subject to any disclaimer, the term of this patent is extended or adjusted under 35 U.S.C. 154(b) by 366 days.

(21) Appl. No.: 14/913,061

(22) PCT Filed: Jul. 31, 2014

(86) PCT No.: PCT/CN2014/083455
§ 371 (c)(1),
(2) Date: Feb. 19, 2016

(87) PCT Pub. No.: WO2015/024430
PCT Pub. Date: Feb. 26, 2015

(65) Prior Publication Data
US 2016/0212234 A1     Jul. 21, 2016

(30) Foreign Application Priority Data
Aug. 19, 2013   (CN) .......................... 2013 1 0362414

(51) Int. Cl.
*G06Q 30/02* (2012.01)
*H04L 12/26* (2006.01)
(Continued)

(52) U.S. Cl.
CPC ......... *H04L 67/26* (2013.01); *G06Q 30/0242* (2013.01); *H04L 43/10* (2013.01); *H04L 67/22* (2013.01); *H04L 67/42* (2013.01)

(58) Field of Classification Search
CPC ......... H04L 67/26; H04L 43/10; H04L 67/22; H04L 67/42; G06Q 30/0242
See application file for complete search history.

(56) References Cited

U.S. PATENT DOCUMENTS 6,092,196 A * 7/2000 Reiche .................... G06F 21/41
                                                                705/52
9,064,269 B1 * 6/2015 Lei ...................... G06Q 30/0241
(Continued)

FOREIGN PATENT DOCUMENTS

CN      101159592 A    4/2008
CN      101609542 A    12/2009
(Continued)

OTHER PUBLICATIONS

English Abstract of CN101609542A, Dec. 23, 2009.

*Primary Examiner* — Philip J Chea
*Assistant Examiner* — Robert B McAdams
(74) *Attorney, Agent, or Firm* — Porter Wright Morris & Arthur LLP

(57) ABSTRACT

The disclosure discloses a monitoring method and device for pushing effect of pushing information. The monitoring method for the pushing effect of the pushing information includes: monitoring user Identifiers (ID) accessing a target website, wherein the target website is a website which displays the pushing information; monitoring user ID accessing a preset website; and determining the pushing effect of the pushing information according to first ID and second ID, wherein the first ID are the monitored user ID accessing the target website, and the second ID are the monitored user ID accessing the preset website. By the (Continued)

disclosure, the problem of incapability in making a statistic about the pushing effect of the pushing information in the conventional art is solved, and the effect of quantitatively monitoring the pushing effect of the pushing information is further achieved.

8 Claims, 1 Drawing Sheet

(51) Int. Cl.
*H04L 29/06* (2006.01)
*H04L 29/08* (2006.01)

(56) References Cited

U.S. PATENT DOCUMENTS

| | | | |
|---|---|---|---|
| 9,641,632 B1* | 5/2017 | Torrance | H04L 67/22 |
| 2009/0006211 A1* | 1/2009 | Perry | G06Q 30/02 |
| | | | 705/14.66 |
| 2011/0214163 A1* | 9/2011 | Smith | G06Q 30/02 |
| | | | 726/4 |

FOREIGN PATENT DOCUMENTS

| | | |
|---|---|---|
| CN | 103412932 A | 11/2013 |
| JP | 2009288906 A | 12/2009 |

* cited by examiner

METHOD AND DEVICE FOR MONITORING PUSH EFFECT OF PUSH INFORMATION

TECHNICAL FIELD OF THE INVENTION

The disclosure relates to the field of data processing, and in particular to a monitoring method and device for pushing effect of pushing information.

BACKGROUND OF THE INVENTION

In the current advertising industry, a clicks are mainly adopted to determine an attention to pushing information such as an advertisement delivered by an advertiser as a main measurement index, but more and more brand advertisers are not only concerned about whether pushing information (for example: delivered advertisements) is viewed or not but also more concerned about pushing effects of the pushing information. Therefore, how to make a statistic about pushing effect of pushing information and determine an index to reflect the pushing effect of the pushing information become problems to be solved.

For the problem of incapability in making a statistic on pushing effect of pushing information in a related technology, there is yet no effective solution.

SUMMARY OF THE INVENTION

A main purpose of the embodiment of the disclosure is to provide a monitoring method and device for pushing effect of pushing information, so as to solve the problem of incapability in making a statistic on pushing effect of pushing information in a conventional art.

According to one aspect of the embodiment of the disclosure, a monitoring method for pushing effect of pushing information is provided, which may include: monitoring user identification (ID) accessing a target website, wherein the target website is a website which displays the pushing information; monitoring user ID accessing a preset website; and determining the pushing effect of the pushing information according to a first ID and a second ID, wherein the first ID is the monitored user ID accessing the target website, and the second ID is the monitored user ID accessing the preset website.

Preferably, determining the pushing effect of the pushing information according to the first ID and the second ID may include: determining a similarity between the first ID and the second ID; and determining the similarity as a first pushing effect of the pushing information.

Preferably, before determining the similarity between the first ID and the second ID, the monitoring method may further include: judging whether the first ID and the second ID have same ID or not, wherein the similarity between the first ID and the second ID is determined under the condition that the first ID and the second ID are determined to have the same ID.

Preferably, after determining the similarity between the first ID and the second ID, the monitoring method may further include: monitoring a number of web pages in the preset website accessed under third ID, wherein the third ID are the same ID in the first ID and the second ID; and determining the monitored number as a second pushing effect of the pushing information.

Preferably, after monitoring the number of the web pages accessed under the third ID in the preset website, the monitoring method may further include: acquiring a number of target web page accessed under the third ID in the preset website in the monitored number; calculating a ratio of the acquired number to the number of the first ID; and determining the ratio as a third pushing effect of the pushing information.

In order to achieve the purpose, according to another aspect of the embodiment of the disclosure, a monitoring device for pushing effect of pushing information is provided, which is configured to execute any monitoring method for the pushing effect of the pushing information provided by the abovementioned content of the embodiment of the disclosure.

According to another aspect of the embodiment of the disclosure, a monitoring device for pushing effect of pushing information is provided, which may include: a first monitoring unit, configured to monitor user ID accessing a target website, wherein the target website is a website which displays a target advertisement; a second monitoring unit, configured to monitor user ID accessing a preset website; and a first determination unit, configured to determine the pushing effect of the pushing information according to a first ID and a second ID, wherein the first ID is the monitored user ID accessing the target website, and the second ID is the monitored user ID accessing the preset website.

Preferably, the first determination unit may include: a comparison module, configured to determine a similarity between the first ID and the second ID; and a determination module, configured to determine the similarity as a first pushing effect of the pushing information.

Preferably, the monitoring device may further include: a judgment unit, configured to judge whether the first ID and the second ID have the same ID or not, wherein the comparison module determines the similarity between the first ID and the second ID under the condition that the first ID and the second ID are determined to have the same ID.

Preferably, the monitoring device may further include: a third monitoring unit, configured to monitor a number of web pages in the preset website accessed under third ID, wherein the third ID are the same ID in the first ID and the second ID; and a second determination unit, configured to determine the monitored number as a second pushing effect of the pushing information.

Preferably, the monitoring device may further include: an acquisition unit, configured to acquire a number of a target web page accessed under the third ID in the preset website in the number monitored by the third monitoring unit; a calculation unit, configured to calculate a ratio of the acquired number to the number of the first ID; and a third determination unit, configured to determine the ratio as a third pushing effect of the pushing information.

According to the embodiment of the disclosure, the user ID accessing the target website are monitored, wherein the target website is the website which displays the pushing information; the user ID accessing the preset website are monitored; and the pushing effect of the pushing information is determined according to the first ID and the second ID, wherein the first ID is the monitored user ID accessing the target website, and the second ID is the monitored user ID accessing the preset website. The user ID accessing the target website are monitored to implement monitoring of each user identification which views the pushing information, the user ID accessing the specified website are monitored to implement monitoring of each user identification which arrives at an official website, campaign website or the like of an advertiser, and a statistic about the user ID which view the pushing information and arrive at the official website, campaign website or the like of the advertiser may further be made according to the first ID and the second ID to implement determination of the pushing effect of the pushing information, so that the problem of incapability in making the statistic about the pushing effect of the pushing information in the conventional art is solved, and the effect of quantitatively monitoring the pushing effect of the pushing information is further achieved.

BRIEF DESCRIPTION OF THE DRAWINGS

The drawings forming a part of the disclosure are adopted to provide further understanding of the disclosure, and schematic embodiments of the disclosure and description thereof are adopted to explain the disclosure and not intended to form improper limits to the disclosure. In the drawings.

DETAILED DESCRIPTION OF THE EMBODIMENTS

It is important to note that the embodiments in the disclosure and characteristics in the embodiments can be combined under the condition of no conflicts. The disclosure will be described below with reference to the drawings and the embodiments in detail.

The embodiment of the disclosure provides a monitoring method for pushing effect of pushing information. The monitoring method for the pushing effect of the pushing information provided by the embodiment of the disclosure will be specifically introduced with the condition that the pushing information is an advertisement delivered by an advertiser as an example.

Figure 1:
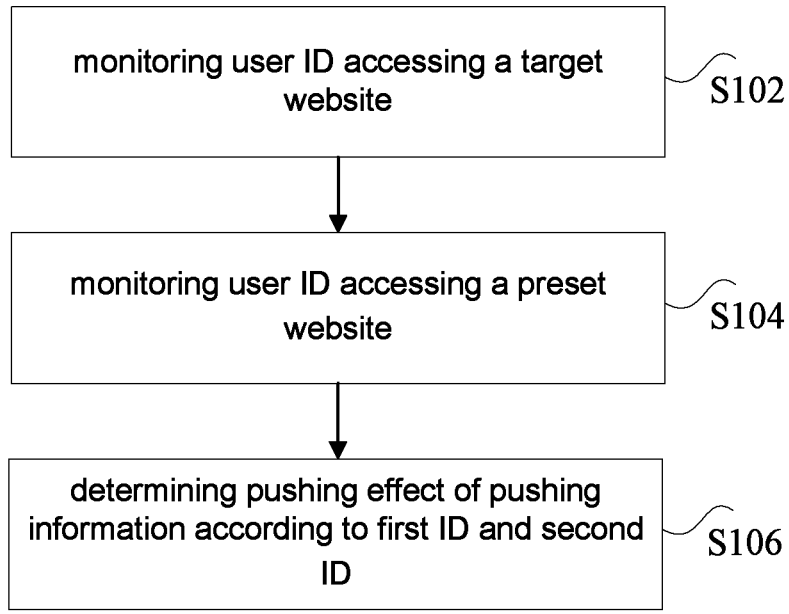
FIG. 1 is a flowchart of a monitoring method for pushing effect of pushing information according to an embodiment of the disclosure.

FIG. 1 is a flowchart of a monitoring method for pushing effect of pushing information according to an embodiment of the disclosure. As shown in FIG. 1, the method includes the following Step 102 to Step 106:

Step 102: monitoring user identification (ID) accessing a target website, wherein the target website is a website which displays a target advertisement (i.e. the pushing information), the user ID may be cookie ID of users accessing the target website, and since the target website is the website which displays the target advertisement, monitoring the user ID accessing the target website is to monitor each user identification (i.e. cookie id) viewing the target advertisement.

Step 104: monitoring user ID accessing a preset website, wherein the preset website is a website which is specified by an advertiser of the target advertisement, and since the preset website is the website which is specified by the advertiser of the target advertisement, and is usually an official website or campaign website of the advertiser, monitoring the user ID accessing the preset website is to monitor each user identification entering the official website or campaign website of the advertiser.

Step 106: determining the pushing effect of the pushing information according to a first ID and a second ID, wherein the first ID is the monitored user ID accessing the target website, the second ID is the monitored user ID accessing the preset website, and the embodiment of the disclosure provides a method for determining the pushing effect of the pushing information according to the first ID and the second ID, specifically including: compare the first ID and the second ID to determine a similarity between the first ID and the second ID and determining the similarity as a first pushing effect of the pushing information. Comparing the similarity is to calculate a ratio of the number of third ID (the third ID are the same ID in the first ID and the second ID) to the number of the first ID, that is, in the embodiment of the disclosure, a ratio of the number of the user ID entering the official website or campaign website of the advertiser to the number of the user ID viewing the target advertisement is determined as pushing effect of the target advertisement, and the pushing effect may be called a display arrival rate.

According to the monitoring method for the pushing effect of the pushing information in the embodiment of the disclosure, the user ID accessing the target website are monitored to implement monitoring of each user identification which views the pushing information, the user ID accessing the specified website are monitored to implement monitoring of each user identification which arrives at the official website, campaign website or the like of the advertiser, and a statistic about the user ID which view the pushing information and arrive at the official website, campaign website or the like of the advertiser may further be made according to the first ID and the second ID to implement determination of the pushing effect of the pushing information, so that the problem of incapability in making the statistic about the pushing effect of the pushing information in the conventional art is solved, and the effect of quantitatively monitoring the pushing effect of the pushing information is further achieved.

In a preferred implementation mode, before determining the similarity between the first ID and the second ID, the monitoring method of the embodiment of the disclosure further includes judging whether the first ID and the second ID have same ID or not, namely judging whether the cookie ID in the first ID and the cookie ID in the second ID have the same cookie ID or not, wherein the similarity between the first ID and the second ID is compared under the condition that the first ID and the second ID are determined to have the same ID.

Preferably, after determining the similarity between the first ID and the second ID, the monitoring method of the embodiment of the disclosure further includes: monitoring a number of web pages accessed under the third ID in the preset website, and determining monitored data as a second pushing effect of the target advertisement. That is, the number of the web pages accessed by users viewing the target advertisement and arriving at the specified website is monitored. Specifically, during a page is accessed, a client browser may perform session interaction with a background server through a session ID, and every time when a page is accessed, a client may send corresponding pageview data to the server, and by monitoring the pageview data, the accessed page may be monitored, and the number of the page may be obtained.

By recording the number of the web pages, the number of users who view the target advertisement, arrive at the specified website and browse a target advertised commodity is recorded, and the pushing effect of the pushing information is further quantitatively monitored.

Preferably, after monitoring the number of the web pages accessed under the third ID in the preset website, the monitoring method of the embodiment of the disclosure further includes: acquiring a number of a accessed target web page in the preset website in the monitored number, calculating a ratio of the acquired view to the number of the first ID, and determining the calculated ratio as a third pushing effect of the target advertisement.

In the embodiment of the disclosure, the target web page may be a purchasing page of the target advertised commodity, that is, the number of the users who view the target advertisement, arrive at the specified website and arrive at the purchasing page of the target advertised commodity is acquired. Wherein, calculating the ratio of the acquired number to the number of the first ID and determining the calculated ratio as the third pushing effect of the target advertisement is to determine a ratio of the number of the user ID entering the purchasing page to the number of the user ID viewing the target advertisement as the third pushing effect, and the third pushing effect may be called a purchasing arrival rate.

By recording the number of the purchasing page and calculating the ratio of the view to the number of the first ID, a statistic about the number of the users who view the target advertisement and arrive at the purchasing page of the target advertised commodity through the specified website is made, and the pushing effect of the pushing information is monitored more specifically.

The embodiment of the disclosure further provides a monitoring device for pushing effect of pushing information, which is mainly configured to execute the monitoring method for the pushing effect of the pushing information provided by the abovementioned content of the embodiment of the disclosure. The monitoring device for the pushing effect of the pushing information provided by the embodiment of the disclosure will be specifically introduced with the condition that the pushing information is an advertisement delivered by an advertiser as an example.

Figure 2:
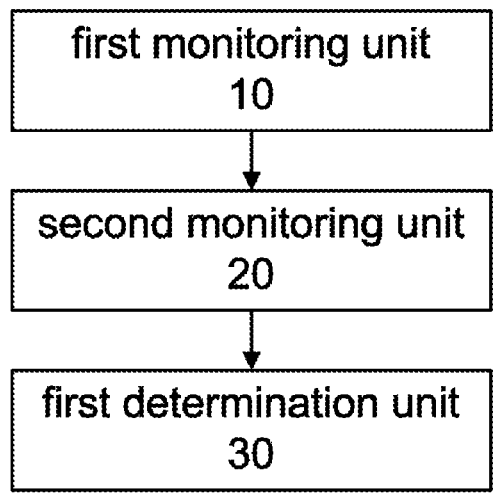
FIG. 2 is a diagram of a monitoring device for pushing effect of pushing information according to an embodiment of the disclosure.

FIG. 2 is a diagram of a monitoring device for pushing effect of pushing information according to an embodiment of the disclosure. As shown in FIG. 2, the monitoring device of the embodiment mainly includes a first monitoring unit 10, a second monitoring unit 20 and a first determination unit 30.

In a preferred implementation mode, the first monitoring unit 10 is configured to monitor user ID accessing a target website, wherein the target website is a website which displays a target advertisement (i.e. the pushing information), the user ID may be cookie ID of users accessing the target website, and since the target website is the website which displays the target advertisement, monitoring the user ID accessing the target website is to monitor each user identification (i.e. cookie id) viewing the target advertisement.

The second monitoring unit 20 is configured to monitor user ID accessing a preset website, wherein the preset website is a website which is specified by an advertiser of the target advertisement, and since the preset website is the website which is specified by the advertiser of the target advertisement, and is usually an official website or campaign website of the advertiser, monitoring the user ID accessing the preset website is to monitor each user identification entering the official website or campaign website of the advertiser.

The first determination unit 30 is configured to determine the pushing effect of the pushing information according to first ID and second ID, wherein the first ID are the monitored user ID accessing the target website, and the second ID are the monitored user ID accessing the preset website. Specifically, the first determination unit 30 mainly includes a comparison module and a determination module, wherein the comparison module is configured to determine a similarity between the first ID and the second ID, and the determination module is configured to determine the similarity as a first pushing effect of the pushing information.

Comparing the similarity is to calculate a ratio of the number of third ID (the third ID are the same ID in the first ID and the second ID) to the number of the first ID, that is, in the embodiment of the disclosure, a ratio of the number of the user ID entering the official website or campaign website of the advertiser to the number of the user ID viewing the target advertisement is determined as pushing effect of the target advertisement, and the pushing effect may be called a display arrival rate.

According to the monitoring device for the pushing effect of the pushing information in the embodiment of the disclosure, the user ID accessing the target website are monitored to implement monitoring of each user identification which views the pushing information, the user ID accessing the specified website are monitored to implement monitoring of each user identification which arrives at the official website, campaign website or the like of the advertiser, and a statistic about the user ID which view the pushing information and arrive at the official website, campaign website or the like of the advertiser may further be made according to the first ID and the second ID to implement determination of the pushing effect of the pushing information, so that the problem of incapability in making the statistic about the pushing effect of the pushing information in the conventional art is solved, and the effect of quantitatively monitoring the pushing effect of the pushing information is further achieved.

In a preferred implementation mode, the monitoring device of the embodiment of the disclosure further includes a judgment unit, wherein the judgment unit is configured to judge whether the first ID and the second ID have same ID or not, namely judge whether the cookie ID in the first ID and the cookie ID in the second ID have the same cookie ID or not, wherein the comparison module compares the similarity between the first ID and the second ID under the condition that the judgment unit determines that the first ID and the second ID have the same ID.

Preferably, the monitoring device of the embodiment of the disclosure further includes a third monitoring unit and a second determination unit, wherein the third monitoring unit is configured to monitor a number of web pages accessed under the third ID in the preset website, and the second determination unit is configured to determine monitored data as a second pushing effect of the target advertisement. That is, the number of the web pages accessed by users viewing the target advertisement and arriving at the specified website is monitored. Specifically, in a page viewing process, a client browser may perform session interaction with a background server through a session ID, and every time when a page is accessed, a client may send corresponding pageview data to the server, and by monitoring the pageview data, the accessed page may be monitored, and the number of the page may be obtained.

By recording the number of the web pages, the number of users who view the target advertisement, arrive at the specified website and browse a target advertised commodity is recorded, and the pushing effect of the pushing information is further quantitatively monitored.

Preferably, the monitoring device of the embodiment of the disclosure further includes an acquisition unit, a calculation unit and a third determination unit, wherein the acquisition unit is configured to acquire a number of a accessed target web page in the preset website in the view monitored by the third monitoring unit, the calculation unit is configured to calculate a ratio of the acquired view to the number of the first ID, and the third determination unit is configured to determine the calculated ratio as a third pushing effect of the target advertisement.

In the embodiment of the disclosure, the target web page may be a purchasing page of the target advertised commodity, that is, the number of the users who view the target advertisement, arrive at the specified website and arrive at the purchasing page of the target advertised commodity is acquired. Wherein, calculating the ratio of the acquired view to the number of the first ID and determining the calculated ratio as the third pushing effect of the target advertisement is to determine a ratio of the number of the user ID entering the purchasing page to the number of the user ID viewing the target advertisement as the third pushing effect, and the third pushing effect may be called a purchasing arrival rate.

By recording the number of the purchasing page and calculating the ratio of the view to the number of the first ID, a statistic about the number of the users who view the target advertisement and arrive at the purchasing page of the target advertised commodity through the specified website is made, and the pushing effect of the pushing information is monitored more specifically.

From the above description, it can be seen that the disclosure achieves the effect of quantitatively monitoring the pushing effect of the pushing information.

It is important to note that the steps shown in the flowchart of the drawing may be executed in a computer system, such as a group of computers, capable of executing instructions, and moreover, a logic sequence is shown in the flowchart, but the shown or described steps may be executed in a sequence different from the logic sequence described here under a certain condition.

Obviously, those skilled in the art should know that each module or step of the disclosure may be implemented by a universal computing device, and the modules or the steps may be concentrated on a single computing device or distributed on a network formed by multiple computing devices, and may optionally be implemented by programmable codes executable for the computing devices, so that the modules or the steps may be stored in a storage device for execution with the computing devices, or may form each integrated circuit module respectively, or multiple modules or steps therein may form a single integrated circuit module for implementation. As a consequence, the disclosure is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

What is claimed is:

1. A monitoring method for pushing effect of pushing information, comprising:
    monitoring user ID accessing a target website, wherein the target website is a website which displays the pushing information;
    monitoring user ID accessing a preset website; and
    determining the pushing effect of the pushing information according to a first ID and a second ID, wherein the first ID is the monitored user ID accessing the target website, and the second ID is the monitored user ID accessing the preset website;
wherein determining the pushing effect of the pushing information according to the first ID and the second ID comprises:
    determining a similarity between the first ID and the second ID; and
    determining the similarity as a first pushing effect of the pushing information;
wherein the similarity is a ratio of the number of a third ID to the number of the first ID, wherein the third ID is the same ID in the first ID and the second ID, and the first pushing effect is a display arrival rate.

2. The monitoring method according to claim 1, before determining the similarity between the first ID and the second ID, further comprising:
    judging whether the first ID and the second ID have same ID or not,
wherein the similarity between the first ID and the second ID is determined under the condition that the first ID and the second ID are determined to have the same ID.

3. The monitoring method according to claim 1, after determining the similarity between the first ID and the second ID, further comprising:
    monitoring a number of web pages in the preset website accessed under the third ID; and
    determining the monitored number as a second pushing effect of the pushing information.

4. The monitoring method according to claim 3, after monitoring the number of the web pages accessed under the third ID in the preset website, further comprising:
    acquiring a number of target web page accessed under the third ID in the preset website in the monitored number;
    calculating a ratio of the acquired number to the number of the first ID; and
    determining the ratio as a third pushing effect of the pushing information.

5. A monitoring device for pushing effect of pushing information, comprising: a computing device coupled with a memory and configured to execute program units stored in the memory, wherein the program units comprise:
    a first monitoring unit, configured to monitor user ID accessing a target website, wherein the target website is a website which displays a target advertisement;
    a second monitoring unit, configured to monitor user ID accessing a preset website; and
    a first determination unit, configured to determine the pushing effect of the pushing information according to a first ID and a second ID, wherein the first ID is the monitored user ID accessing the target website, and the second ID is the monitored user ID accessing the preset website;
wherein the first determination unit comprises: a comparison module, configured to determine a similarity between the first ID and the second ID; and a determination module, configured to determine the similarity as a first pushing effect of the pushing information;
wherein the similarity is a ratio of the number of the third ID to the number of the first ID, wherein the third ID is the same ID in the first ID and the second ID, and the first pushing effect is a display arrival rate.

6. The monitoring device according to claim 5, wherein the program units further comprise:
    a judgment unit, configured to judge whether the first ID and the second ID have same ID or not,
wherein the comparison module determines the similarity between the first ID and the second ID under the condition that the first ID and the second ID are determined to have the same ID.

7. The monitoring device according to claim 5, wherein the program units further comprise:

a third monitoring unit, configured to monitor a number of web pages in the preset website accessed under the third ID; and a second determination unit, configured to determine the monitored number as a second pushing effect of the pushing information.

8. The monitoring device according to claim 7, wherein the program units further comprise:

an acquisition unit, configured to acquire a number of target web page accessed under the third ID in the preset website in the number monitored by the third monitoring unit;

a calculation unit, configured to calculate a ratio of the acquired number to the number of the first ID; and a third determination unit, configured to determine the ratio as a third pushing effect of the pushing information.

\* \* \* \* \*